(12) United States Patent
Gulick, Jr. et al.

(10) Patent No.: US 12,297,666 B2
(45) Date of Patent: May 13, 2025

(54) CONVERTIBLE SECURITY APPARATUS

(71) Applicant: Scorpion Security Products, Inc., Vestal, NY (US)

(72) Inventors: Franklyn W. Gulick, Jr., Vestal, NY (US); Gary R. Page, Chenango Forks, NY (US); Patrick McEwen, Greene, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 18/023,949

(22) PCT Filed: Sep. 2, 2021

(86) PCT No.: PCT/US2021/048797
§ 371 (c)(1),
(2) Date: Feb. 28, 2023

(87) PCT Pub. No.: WO2022/051454
PCT Pub. Date: Mar. 10, 2022

(65) Prior Publication Data
US 2023/0313568 A1 Oct. 5, 2023

Related U.S. Application Data

(60) Provisional application No. 63/074,546, filed on Sep. 4, 2020.

(51) Int. Cl.
| | | |
|---|---|---|
| *A47B 97/00* | (2006.01) | |
| *E05B 73/00* | (2006.01) | |
| *F16M 11/00* | (2006.01) | |
| *F16M 11/04* | (2006.01) | |
| *F16M 13/02* | (2006.01) | |
| *F16B 2/12* | (2006.01) | |

(52) U.S. Cl.
CPC ...... *E05B 73/0082* (2013.01); *E05B 73/0017* (2013.01); *F16M 11/041* (2013.01);
(Continued)

(58) Field of Classification Search
CPC .. A47B 2097/005; F16M 11/00; F16M 11/06; F16M 11/10
(Continued)

(56) References Cited

U.S. PATENT DOCUMENTS

| | | | |
|---|---|---|---|
| 9,476,439 B1 | 10/2016 | Liao | |
| 9,625,082 B2 * | 4/2017 | Blackburn | ......... F16M 11/2014 |

(Continued)

FOREIGN PATENT DOCUMENTS

WO     2019213490 A1    11/2019

OTHER PUBLICATIONS

International Searching Authority; International Search Report and Written Opinion; Application No. PCT/US21/48797.
(Continued)

*Primary Examiner* — Alfred J Wujciak
(74) *Attorney, Agent, or Firm* — Barclay Damon LLP

(57) ABSTRACT

A security apparatus includes an anchoring member removably coupled to a display surface and defining a cavity with one or more securing elements positioned in the cavity. It further includes a security assembly removably coupled to the anchoring member and comprising a guide with one or more securing element engagement members, a first extension assembly, and a second extension assembly. The first extension assembly moveably coupled to the guide and includes a lock configured to be moved between a locked state and an unlocked state, and the second extension assembly is coupled to the guide. The security assembly is at least partially received in the cavity and the one or more securing elements interact with the one or more securing element engagement members to releasably couple the security assembly to the anchoring member.

8 Claims, 15 Drawing Sheets

(52) U.S. Cl.
CPC ....... *F16M 13/02* (2013.01); *A47B 2097/005* (2013.01); *F16B 2/12* (2013.01); *F16M 11/00* (2013.01)

(58) Field of Classification Search
USPC .... 248/500, 510, 917, 918, 919, 121, 122.1, 248/123.11, 123.2, 125.1, 125.3, 132, 248/149, 161, 162.1, 407, 157
See application file for complete search history.

(56) References Cited

U.S. PATENT DOCUMENTS

| | | | | |
|---|---|---|---|---|
| 10,520,131 | B2 * | 12/2019 | Burke | F16M 13/022 |
| 10,760,727 | B2 * | 9/2020 | Huang | F16M 11/08 |
| D938,959 | S * | 12/2021 | Xie | D14/452 |
| 2014/0328020 | A1 | 11/2014 | Galant | |
| 2015/0050077 | A1 * | 2/2015 | Huang | F16M 11/2064 403/327 |
| 2015/0342351 | A1 * | 12/2015 | Hung | G09F 7/20 211/26 |
| 2017/0191607 | A1 * | 7/2017 | Huang | F16M 11/08 |
| 2023/0151647 | A1 * | 5/2023 | Gulick | F16M 11/22 248/551 |

OTHER PUBLICATIONS

International Preliminary Report on Patentability; International Application No. PCT/US2021/048797; Dated: Feb. 21, 2024; 21 Pages.
Corrected International Preliminary Report on Patentability; International Application No. PCT/US2021/048797; Dated: Feb. 21, 2024; 21 Pages.

* cited by examiner

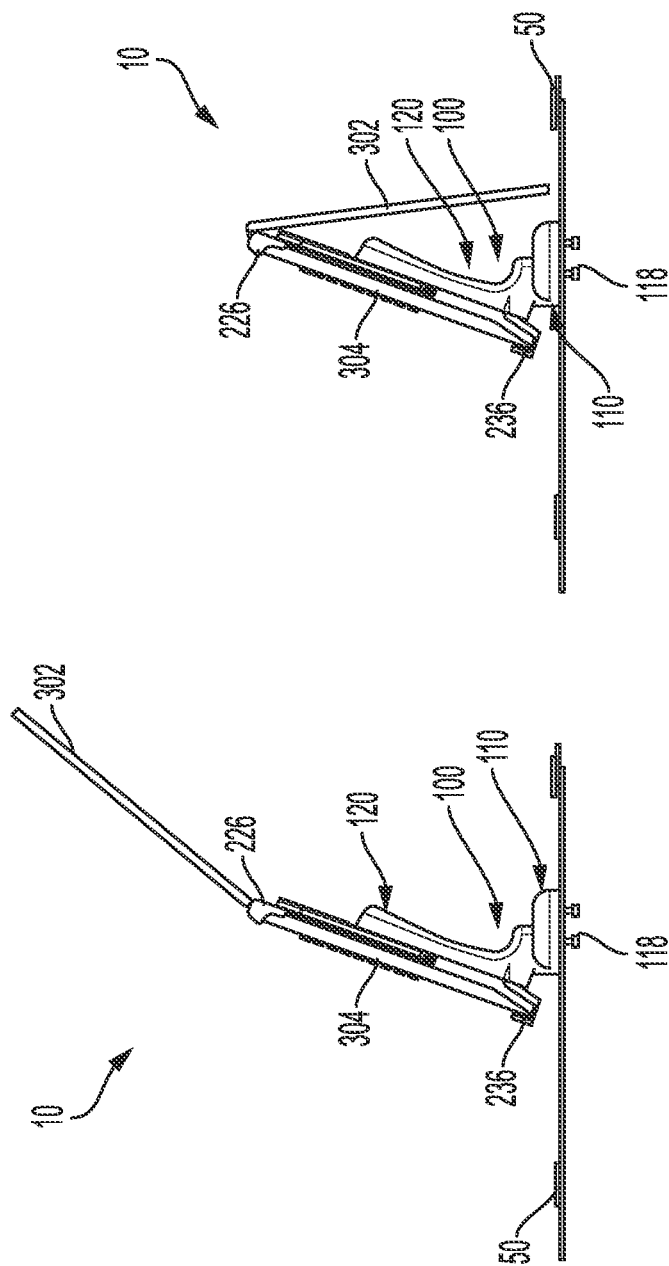

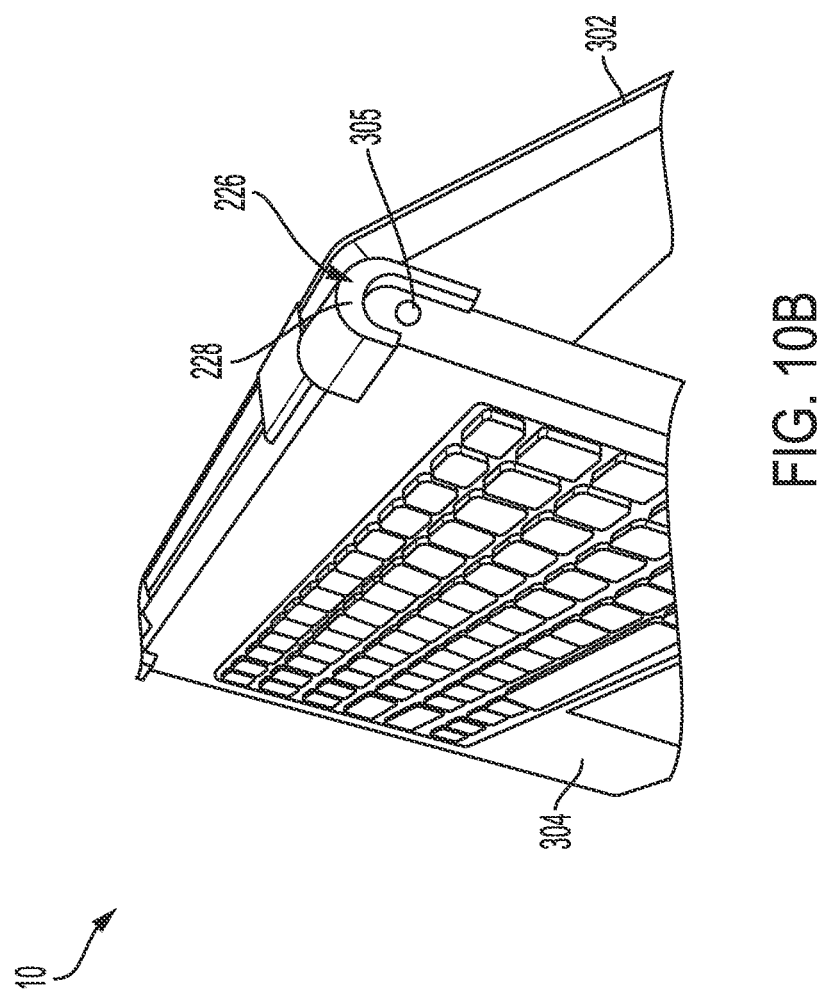

CONVERTIBLE SECURITY APPARATUS

CROSS-REFERENCE TO RELATED APPLICATION

This application is a national stage application filed pursuant to 35 U.S.C. § 371 of International Application No. PCT/US2021/048797, which was filed on Sep. 2, 2021 and claims the benefit of and priority to U.S. Provisional Application No. 63/074,546 filed on Sep. 4, 2020 in the US Patent Office. The entire contents of this PCT application is hereby incorporated by reference.

TECHNOLOGICAL FIELD

The following disclosure relates to a convertible security apparatus that is easily locked and unlocked without the use of special tools, and which is adjustable to facilitate secure and functional display of laptop computers and tablets of various sizes.

BACKGROUND

Retailers sell a wide range of portable or hand held electronic devices that can assist in or perform a multitude of tasks for the user or customer. When shopping for such devices, customers desire and often expect an opportunity to examine and test the portable electronic device a retail setting. This is done using floor models that are fitted with some form of security apparatus to prevent theft of the portable electronic device.

There are many different types of security apparatuses used in the retail settings. Some security apparatuses enable a customer to pick up the portable electronic device while keeping it attached to or tethered to a part of the security apparatus. Other security apparatuses include a fixed portion that remains connected to the display surface and a second portion attached to the electronic device. These security apparatuses enable the customer to freely hold the portable electronic device while the second portion of the security apparatus remains attached to the portable electronic device.

Unfortunately, these devices are not suitable for all types of portable electronic devices. Moreover, the current security apparatuses require an employee to use a tool or key to free the portable electronic device from the security apparatus. These keys are proprietary to the particular security apparatus and are frequently lost or stolen. Consequently, retailers must order extra keys every year. Other security apparatuses use biometric sensors which permit a select group of employees to lock and unlock the security apparatus. While these devices eliminate the need for a separate key, they are much more expensive and require frequent updates due to employee turnover.

The foregoing are just some of the problems related to current security apparatuses for handheld/portable electronic devices.

BRIEF DESCRIPTION

An embodiment of a security apparatus comprises an anchoring member that is removably coupled to a display surface. The anchoring member includes a base, a body coupled to the base and defining a cavity, and one or more securing elements positioned in the cavity. The security apparatus further includes a security assembly that is removably coupled to the anchoring member. The security assembly includes a guide defining an opening and one or more securing element engagement members, a first extension assembly, and a second extension assembly. The first extension assembly is moveably coupled to the guide through the opening and includes a support comprising a lock configured to be moved between a locked state and an unlocked state, and at least one extension pivotally coupled to the support. The second extension assembly is coupled to the guide through the opening and includes a support coupled to the guide and a holder coupled to the support. The security assembly is configured to be at least partially received in the cavity of the body such that the one or more securing elements interact with the one or more securing element engagement members to releasably couple the security assembly to the anchoring member.

Another embodiment of the security apparatus includes an anchoring member removably coupled to a display surface and defining a cavity with one or more securing elements positioned in the cavity. A security assembly is removably coupled to the anchoring member and includes a guide comprising one or more securing element engagement members a first extension assembly, and a second extension assembly. The first extension assembly is moveably coupled to the guide and includes a support comprising a lock configured to be moved between a locked state and an unlocked state and at least one extension pivotally coupled to the support. The second extension assembly is coupled to the guide and includes a support coupled to the guide and at least one holder coupled to the support. The security assembly is configured to be at least partially received in the cavity and the one or more securing elements are configured to interact with the one or more securing element engagement members to releasably couple the security assembly to the anchoring member.

An embodiment of a method of securing a portable electronic device comprises structuring an anchoring member to be removably coupled to a display surface, such that the anchoring member defines a cavity and comprises one or more securing elements positioned in the cavity. A security assembly is structured to be removably coupled to the anchoring member. The security assembly includes a guide comprising one or more securing element engagement members, a first extension assembly, and a second extension assembly. The first extension assembly is moveably coupled to the guide and includes a support comprising a lock configured to be moved between a locked state and an unlocked state, at least one extension pivotally coupled to the support, and at least one holder pivotally coupled to the at least one extension. The second extension assembly is coupled to the guide and includes a support coupled to the guide and a holder coupled to the support. At least part of the security assembly is positioned in the cavity of the body, wherein the one or more securing elements are configured to interact with the one or more securing element engagement members to releasably couple the security assembly to the anchoring member. The first extension assembly is advanced in a first direction towards the second extension assembly and the portable electronic device is retained by the at least one holder of the first extension assembly and the at least one holder of the second extension assembly. In the locked state, the first extension assembly is inhibited from advancing in a second direction away from the second extension assembly.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which:

FIG. 5A illustrates a perspective side view of an embodiment of the convertible security apparatus securing a laptop computer that is open;

FIG. 5B illustrates a perspective side view of another embodiment of the convertible security apparatus securing a laptop computer that is over-opened;

FIG. 10B illustrates a side perspective view of another embodiment of the security assembly of the convertible security apparatus;

DETAILED DESCRIPTION

Figure 1B:
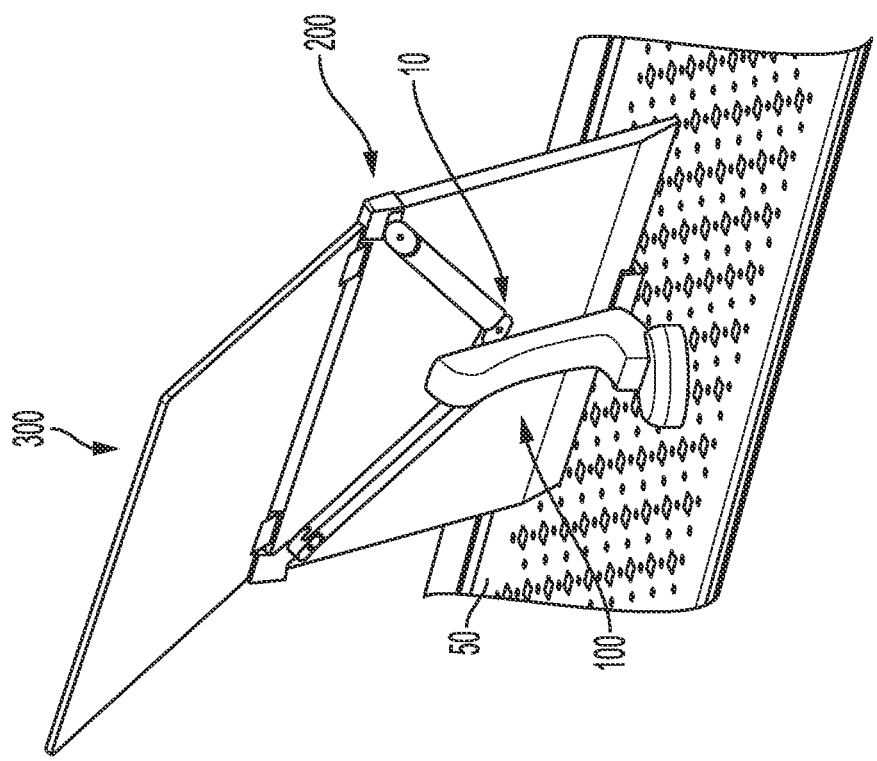
FIG. 1B illustrates the embodiment of the convertible security apparatus of FIG. 1A rotated 180° to show a bottom and a back surface of the laptop computer.
Figure 1A:
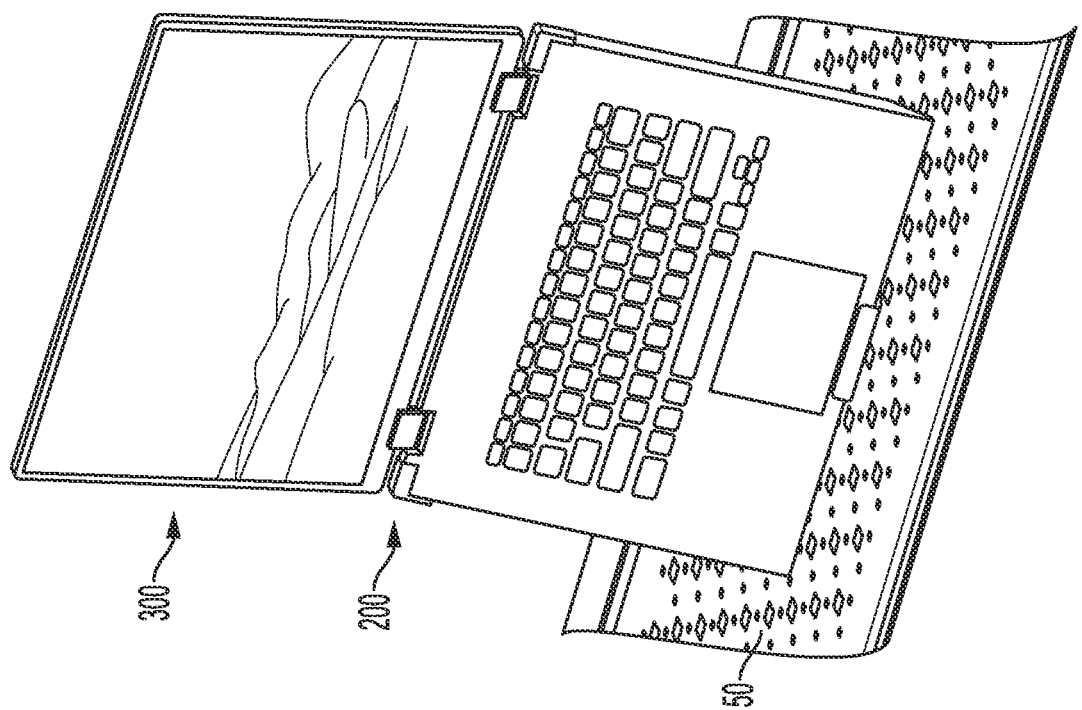
FIG. 1A illustrates a perspective front view of an embodiment of a convertible security apparatus holding a laptop computer in an opened position.
Figure 2B:
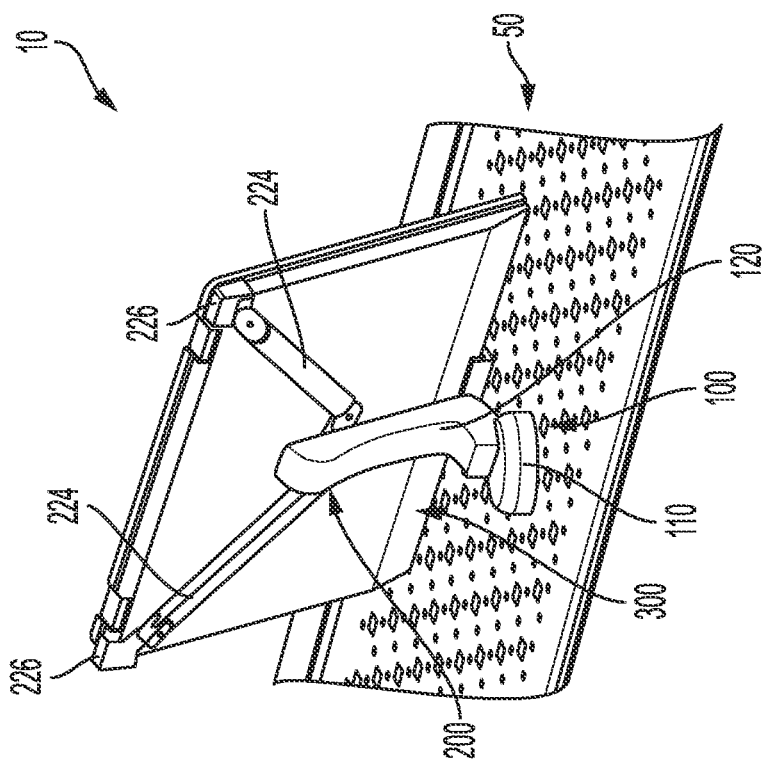
FIG. 2B illustrates the embodiment of a convertible security apparatus of FIG. 2A rotated 180° to show a bottom surface of the closed laptop computer.
Figure 2A:
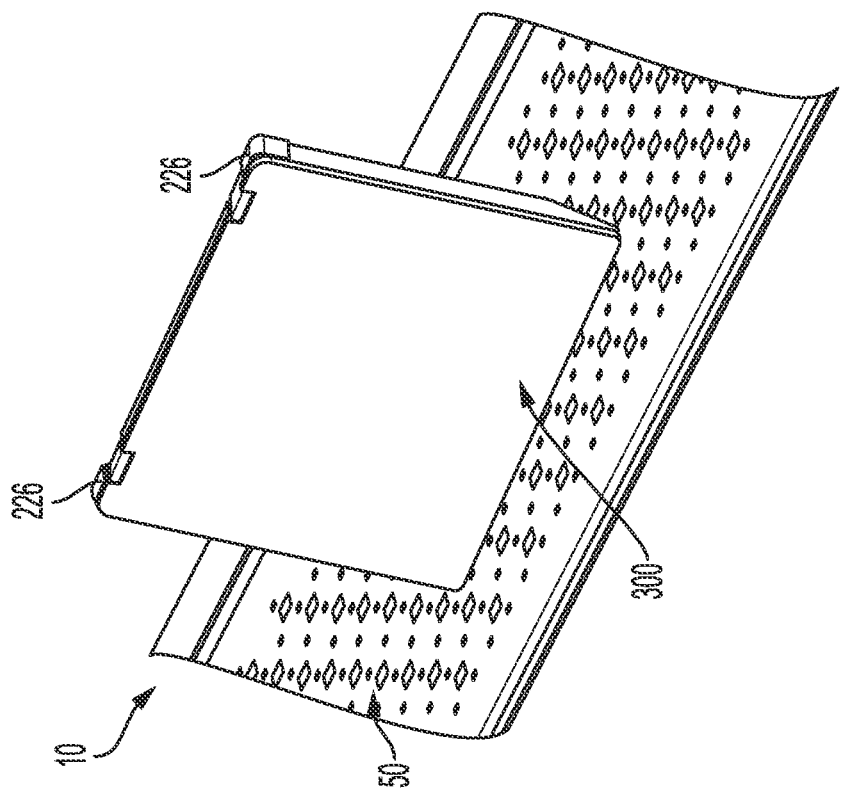
FIG. 2A illustrates a perspective front view of an embodiment of the convertible security apparatus holding a laptop computer that is in the closed position.
Figure 3B:
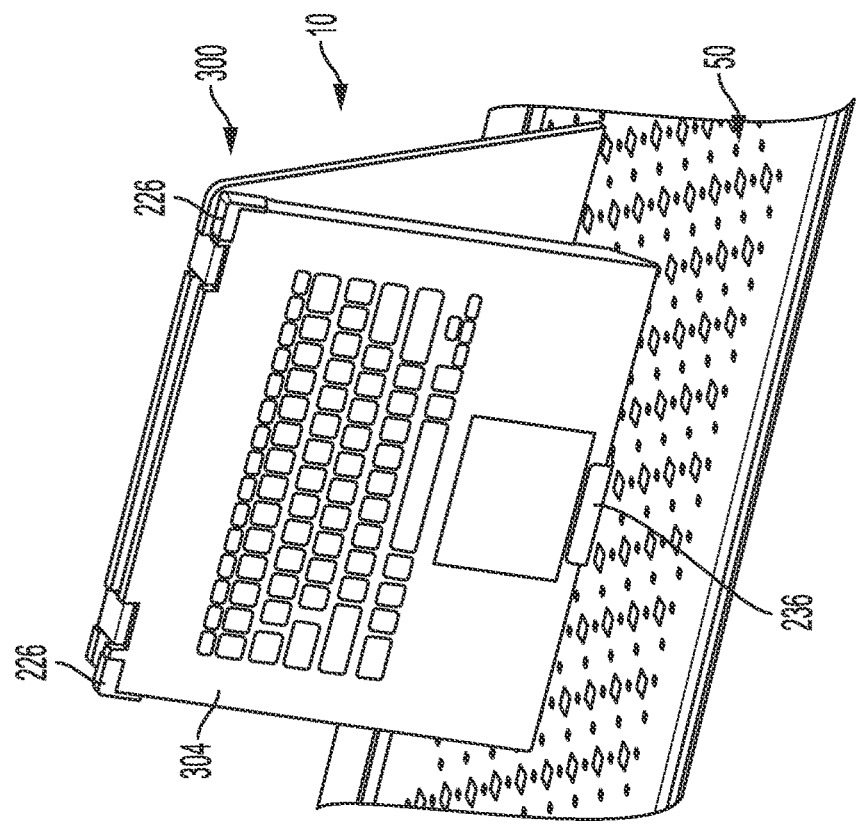
FIG. 3B illustrates the embodiment of a convertible security apparatus of FIG. 3a. rotated 180° to show a keyboard portion of the laptop computer.
Figure 3A:
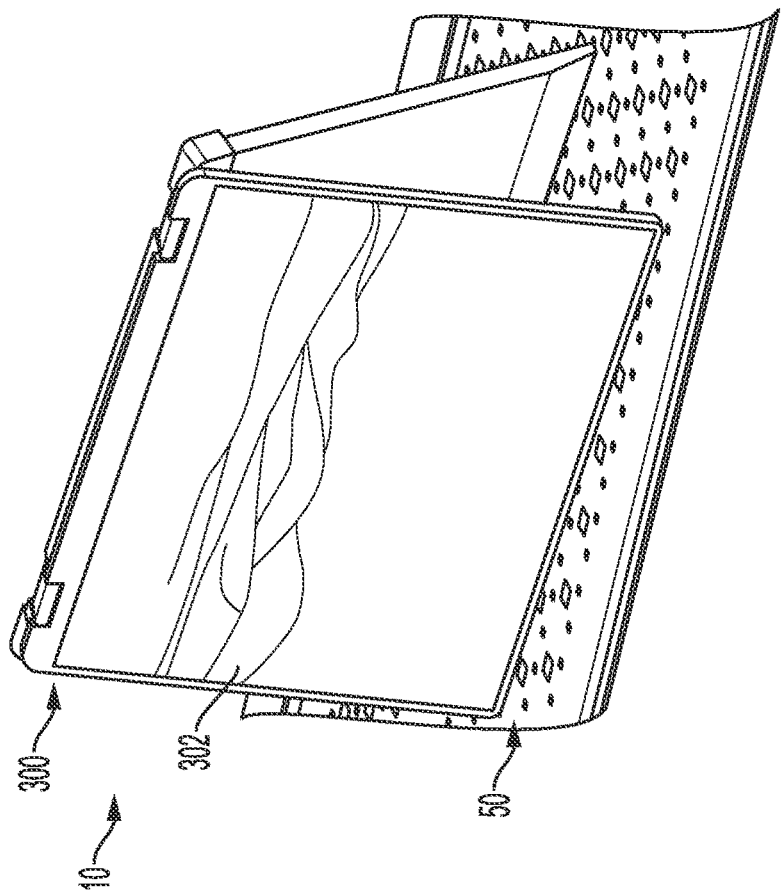
FIG. 3A illustrates a perspective front view of another embodiment of the convertible security apparatus holding a laptop computer that is over-opened such that only the display is visible.
Figure 4:
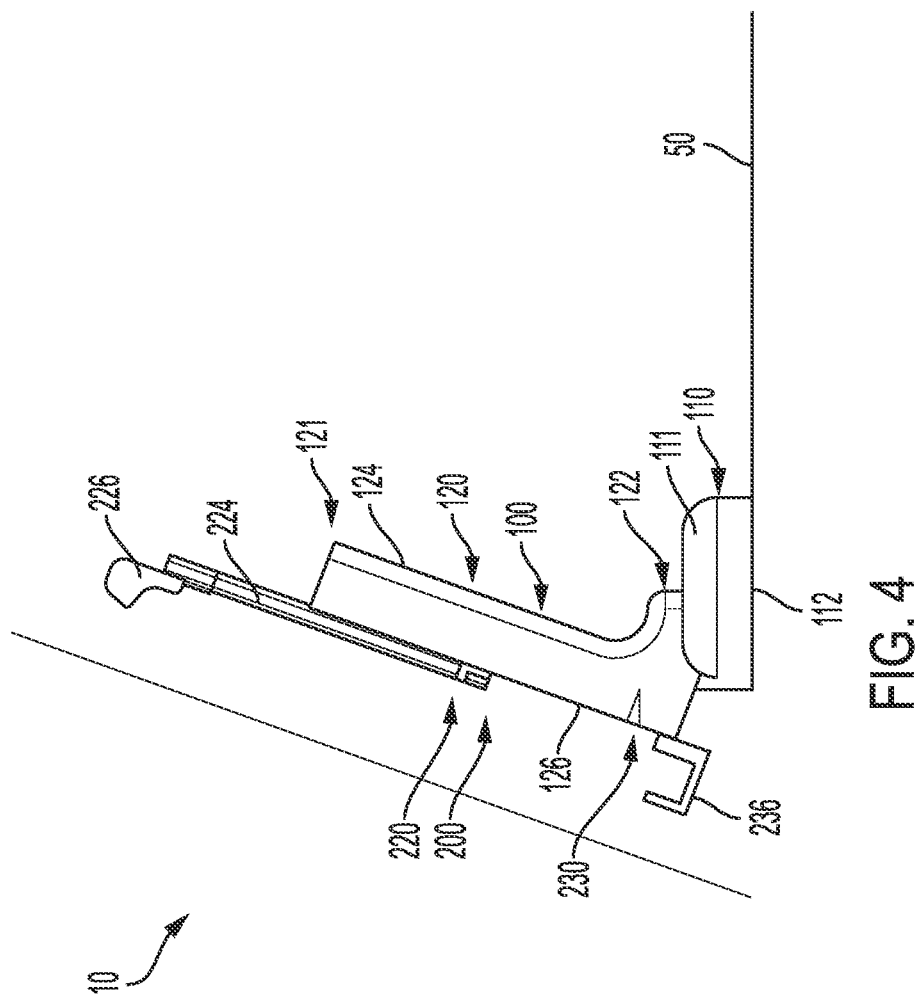
FIG. 4 illustrates a perspective side view of an embodiment of the convertible security apparatus that is not holding a portable electronic device.
Figure 6A:
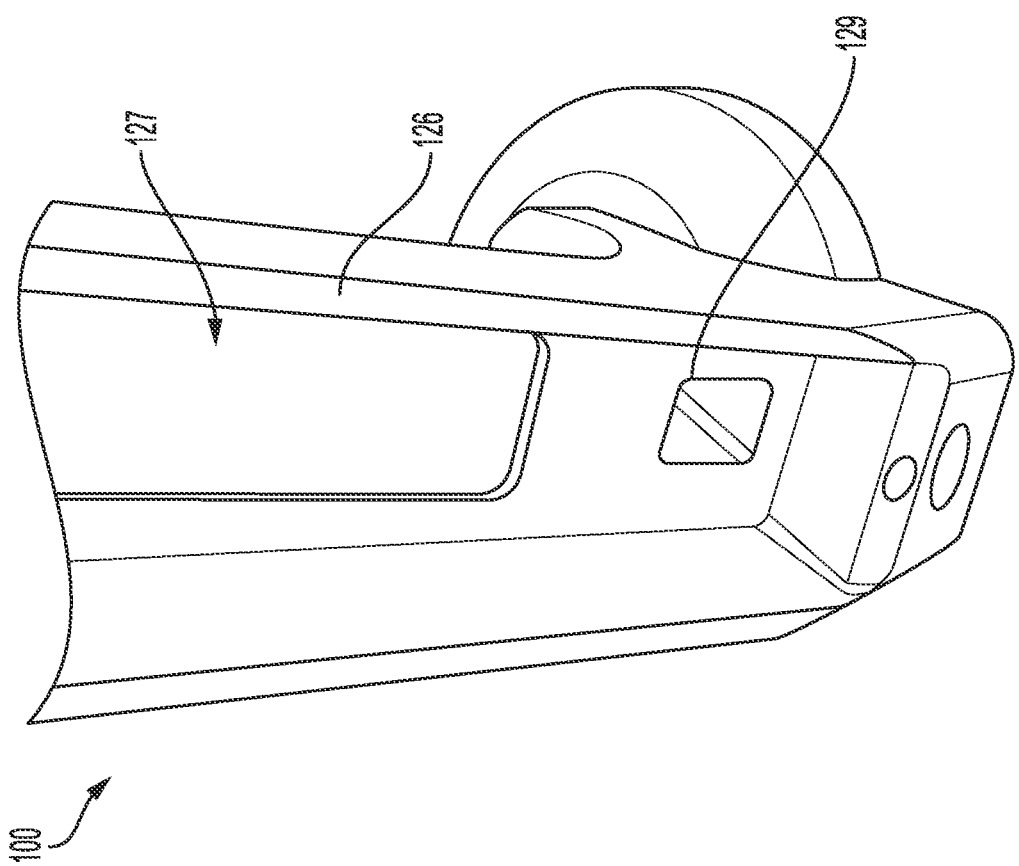
FIG. 6A illustrates a close-up view of a latch opening of an embodiment of the anchor of the convertible security apparatus.
Figure 6B:
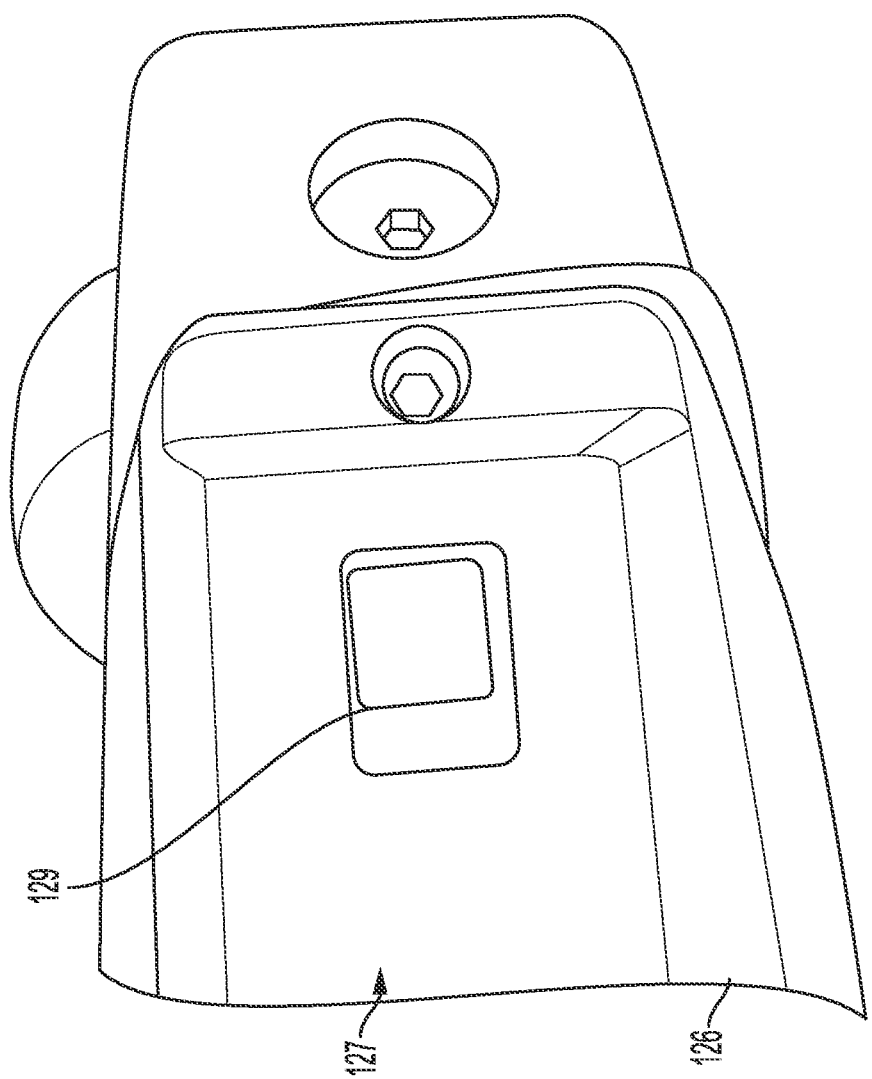
FIG. 6B illustrates another close-up view of the latch opening of an embodiment of the anchor of the convertible security apparatus.
Figure 7:
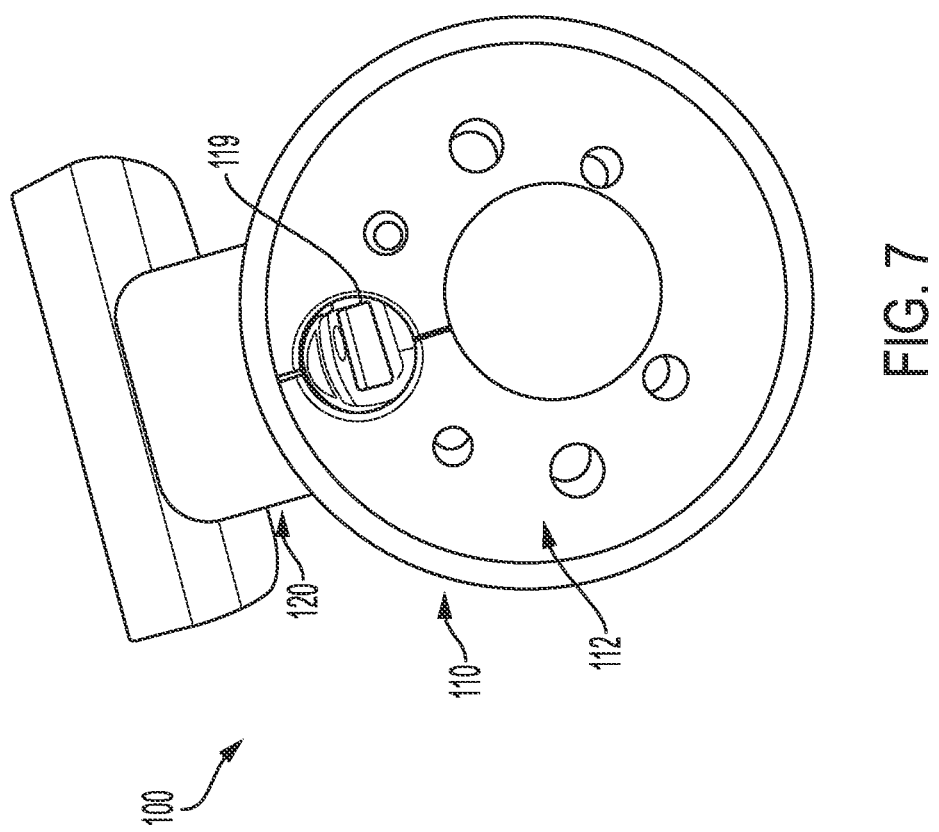
FIG. 7 illustrates a close-up view of a bottom surface of an embodiment of the anchor of the convertible security apparatus.

The following discussion relates to various embodiments of a convertible security apparatus. It will be readily apparent that these embodiments are merely examples and that numerous variations and modifications are possible that embody the inventive aspects discussed herein. To that end, other variations and modifications will be readily apparent to those of sufficient skill in the field. In addition, a number of terms are used throughout this discussion in order to provide a suitable frame of reference with regard to the accompanying drawings. These terms such as "first", "second", "top", "bottom", "forward", "rearward", "interior", "exterior", "front", "back" and the like are not intended to limit these concepts, except where so specifically indicated. The terms "about" or "approximately" as used herein may refer to a range of 80%-125% of the claimed or disclosed value. With regard to the drawings, their purpose is to depict salient features of the convertible security apparatus and are not specifically provided to scale, and should not be relied upon for scaling purposes.

Referring to FIGS. 1A-3B, an embodiment of a convertible security apparatus 10 ("security apparatus") generally comprises an anchor 100 or anchoring member configured to be coupled to a display surface or display fixture 50. The anchor 100 is configured to support or receive a security assembly 200 that secures a portable electronic device 300, such as a laptop computer. As shown, the anchor 100 is capable of rotating relative to the display fixture 50 so that the portable electronic device 300 can be rotated by a customer in order to inspect all sides of the portable electronic device 300 while it is secured to the display fixture 50. In an embodiment, the anchor 100 may rotate at least 180° and in other embodiment, the anchor 100 may rotate a full 360°.

Turning to FIGS. 4-7, the anchor 100 includes a base 110 having a top surface 111 and a bottom surface 112. In an embodiment, the bottom surface 112 includes or is able to accept one or more fasteners 118 in order to couple the anchor 100 to the display fixture 50. The anchor 100 further includes a body 120 that has a bottom end 122 coupled to the base 110 and an opposing top end 121. The rotation of the anchor 100 may occur at the base 110 or at an interface between the base 110 and the body 120. The body 120 also has a first side 124 and an opposing second side 126. The first side 124 may be generally planar and featureless, however in other embodiments, the first side 124 may be a plurality of surfaces that extend along different planes and can include one or more surface features. As shown in FIGS. 6A-B, the second side 126 defines a cavity 127 that is configured to accept the security assembly 200. The anchor 100 further includes a latching mechanism that has one or more securing elements 129, such as latch openings, are located within the cavity 127.

Referring now to FIGS. 8-10A, the security assembly 200 includes a guide or track 210 having a first side 211 and a second side 212. The first side 211 of the security assembly 200 includes one or more securing element engagement members 219, such as latches, and also has a recessed surface 214 which surrounds an opening 215 that extends from the first side 211 to the second side 212. In the embodiments shown, the opening 215 is an elongated slot that is closed at each end. The second side 212 of the guide 210 has a plurality of surface features 217 such as ridges or teeth that surround the opening 215. The guide 210 also has opposing side surfaces 218. At least one of the opposing side surfaces 218 includes an engagement member 213, such as a groove or a ridge, that extends along the length of the side surface 218.

Figure 8:
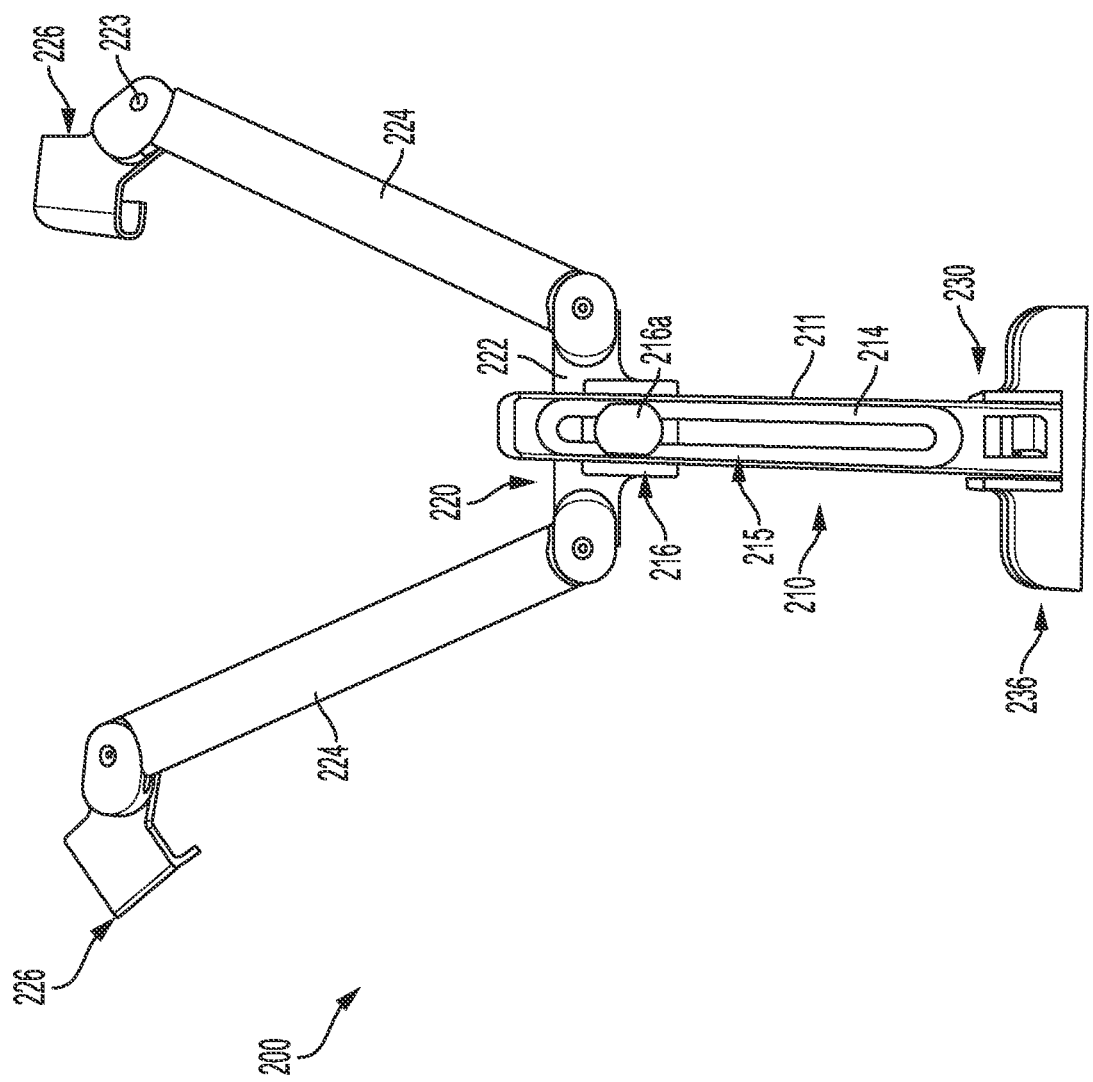
FIG. 8 illustrates a perspective rear view of an embodiment of a security assembly of the convertible security apparatus.
Figure 9:
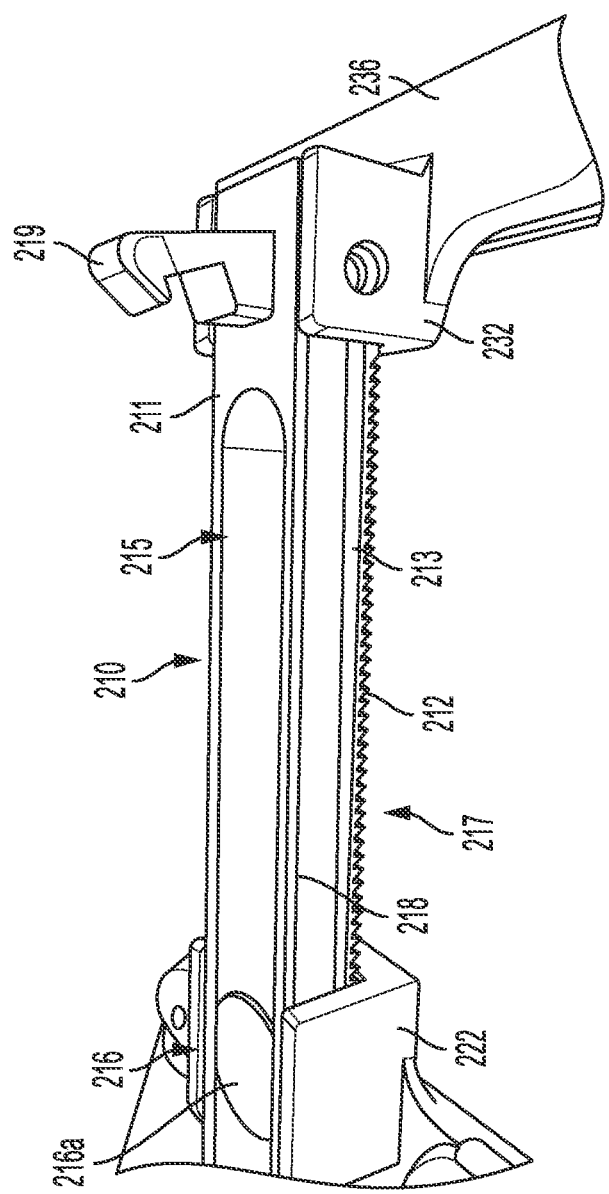
FIG. 9 illustrates a close-up view of a portion of the security assembly of the convertible security apparatus.
Figure 10A:
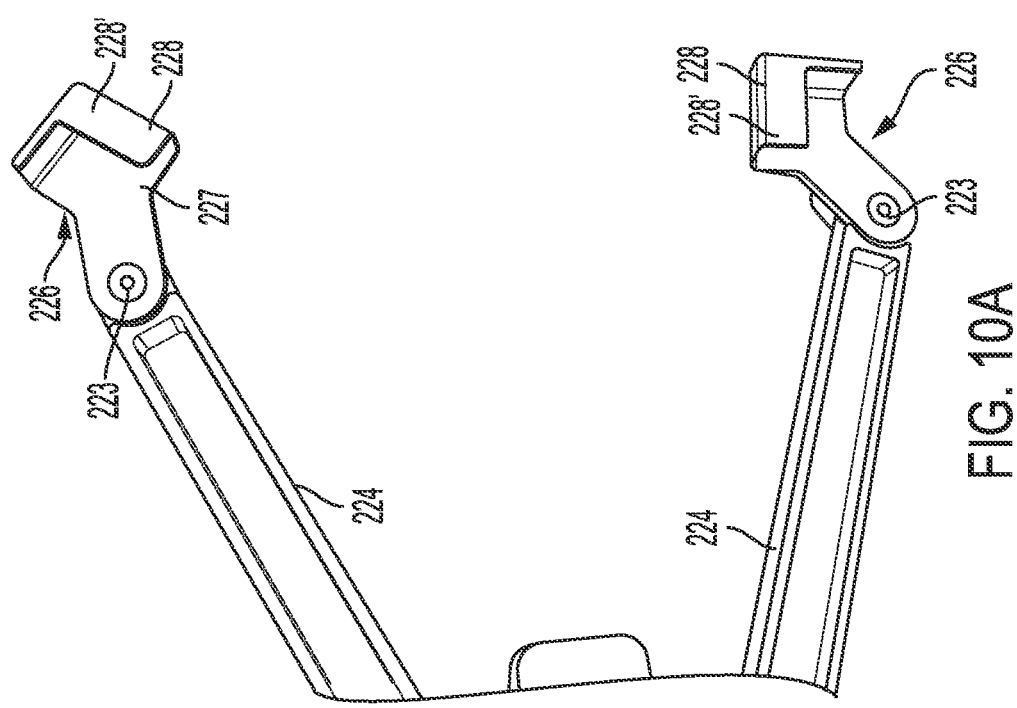
FIG. 10A illustrates a close up view of another portion of the security assembly of the convertible security apparatus.
Figure 11:
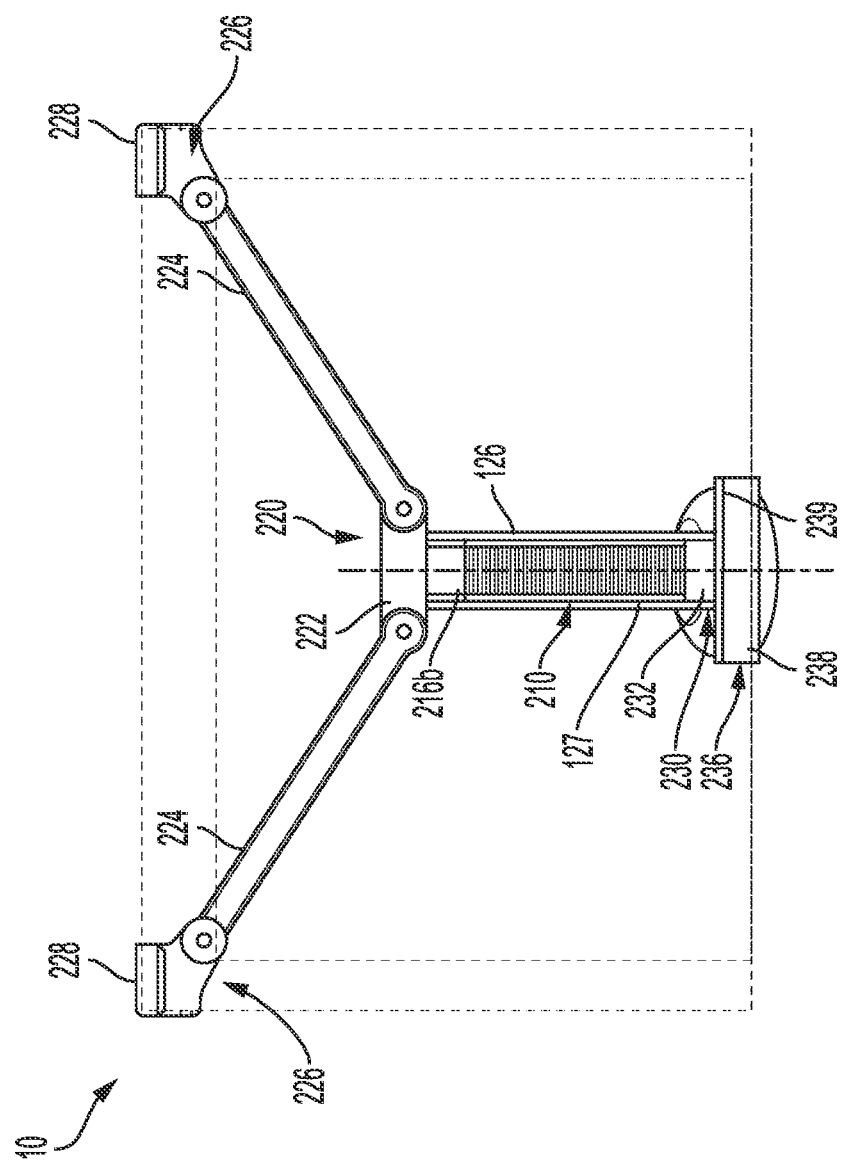
FIG. 11 illustrates a perspective front view of an embodiment of the convertible security apparatus holding a larger portable electronic device shown in phantom.

A first extension assembly 220 is slidably or moveably coupled to one end of the guide 210 and moves relative to the guide 210. A second extension assembly 230 is connected to the second, opposing end of the guide 210. The first extension assembly 220 comprises a support 222 that is slidably coupled to the guide 210 and includes a locking assembly 216. In an embodiment, the support 222 is slidably coupled to the guide 210 through the opening 215 by the locking assembly 216. The support 222 may further comprise one or more complimentary engagement members (not shown) configured to interact with the one or more engagement members 213 to aid in the directional movement of the first extension assembly 220 along the guide 210. As shown in FIGS. 8, 9, and 11, the locking assembly 216 generally includes a depression plate 216a positioned on the first side 211 of the guide 210 and proximate the recessed surface 214. In the embodiment shown in FIG. 11, the depression plate 216a is connected to a locking plate 216b through the opening 215. The locking plate 216b (see FIG. 11) has a plurality of complimentary surface features that interact with the surface features 217 of the second side 212 when the security apparatus 10 is in the locked state. Turning back to FIGS. 8-10A, two extensions 224 are pivotally coupled to the support 222 at one end and are each further pivotally coupled to a holder 226 at an opposing end. The supports 222 are connected to the holders 226 using a fastener 223. In an embodiment, the fastener 223 may be removable or otherwise enable the holder 226 to be removed and replaced with another holder that is the same or different than the original holder 226. In this manner, damaged holders 226 can be replaced and the security apparatus 10 can be customized to the portable electronic device 300 that is being secured. For example, positioning of the charging port 305 tends to vary for each type, brand, and/or model of portable electronic device 300. FIG. 10B illustrates another embodiment of a holder 226 that is structured to fit around the charging port 305 of the portable electronic device 300. Generally, the holders 226 each have a contact surface 227 and a retainer 228. The contact surface 227 of the holder 226 contacts a portion of the portable electronic device 300 and the retainer 228 retains a portion of the portable electronic device 300 when it is secured by the security apparatus 10. As shown in FIG. 10A, the retainer 228 may include one or more retaining members 228' such as lips.

Figure 12:
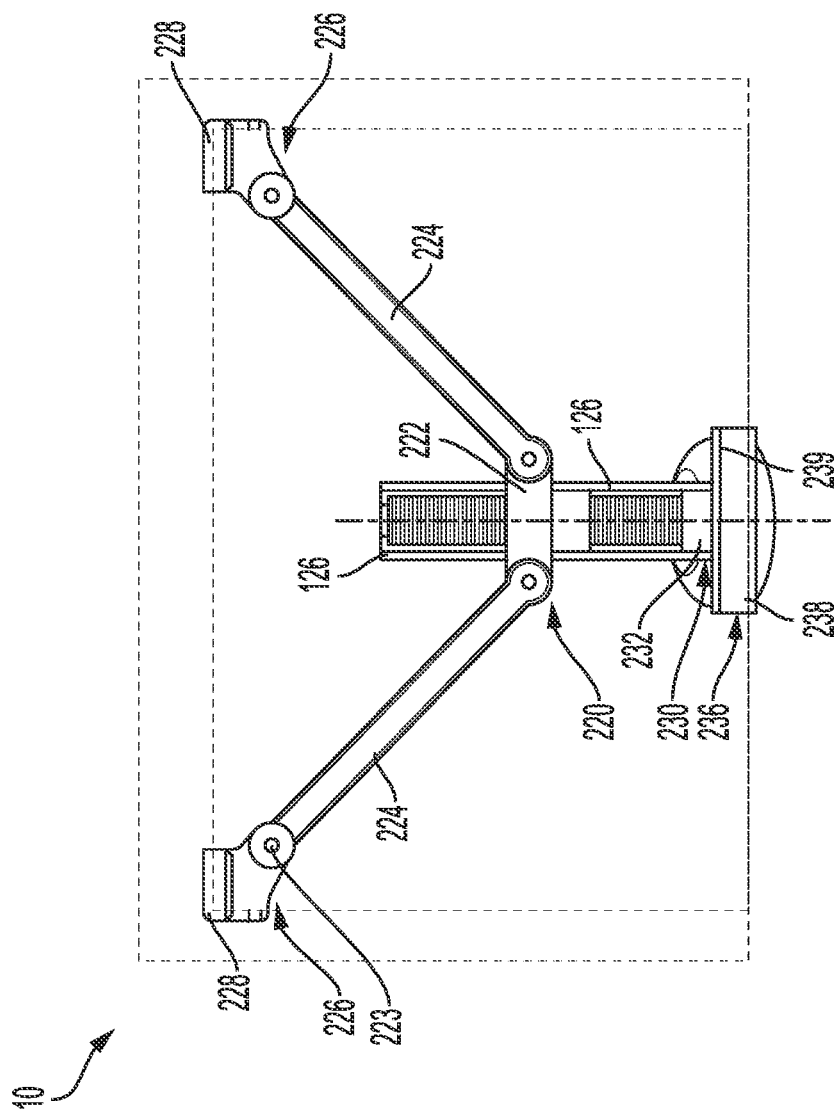
FIG. 12 illustrates a perspective front view of an embodiment of the convertible security apparatus holding a smaller portable electronic device shown in phantom.

Referring to FIGS. 8, 11, and 12, the second extension assembly 230 includes a support 232 that is attached to the guide 210. In one embodiment, the support 232 is coupled to the guide 210 through the opening 215. At least one holder 236 is connected to the support 232 and includes a retainer 238 that has one or more retaining members 239 such as lips. In an embodiment, the second extension assembly 230 is moveably coupled to the guide 210 in a similar manner as the first extension assembly 220 and includes a locking assembly (not shown) similar to the locking assembly 216 previously discussed.

In order to secure a portable electronic device 300, such as a laptop computer, into the security apparatus 10, the first extension assembly 220 is unlocked by depressing the depression plate 216a such that the first extension assembly 220 can be moved freely along the guide 210 in a first direction and in a second direction that is different from the first direction. Moving the first extension assembly 220 in the first direction brings the first extension assembly 220 toward the second extension assembly 230 as shown in FIG. 12, and moving first extension assembly 220 in the second direction moves the first extension assembly 220 away from the second extension assembly 230 as shown in FIG. 11. In order to accept the portable electronic device 300, the first extension assembly 220 is moved in the second direction to "open" the security assembly 200. The security assembly 200 is then inserted into the anchor 100 such that the one or more securing element engagement members 219 are interact with the one or more securing elements 129. At this point, the security assembly 200 is coupled to the anchor 100, and the first side 211 of the guide 210 and the depression plate 216a are both facing the inside of the cavity 127 and are therefore, inaccessible. Once the depression plate 216a is no longer depressed, the first extension assembly 220 is in the locked state and is only able to be moved in the first direction.

Figure 13:
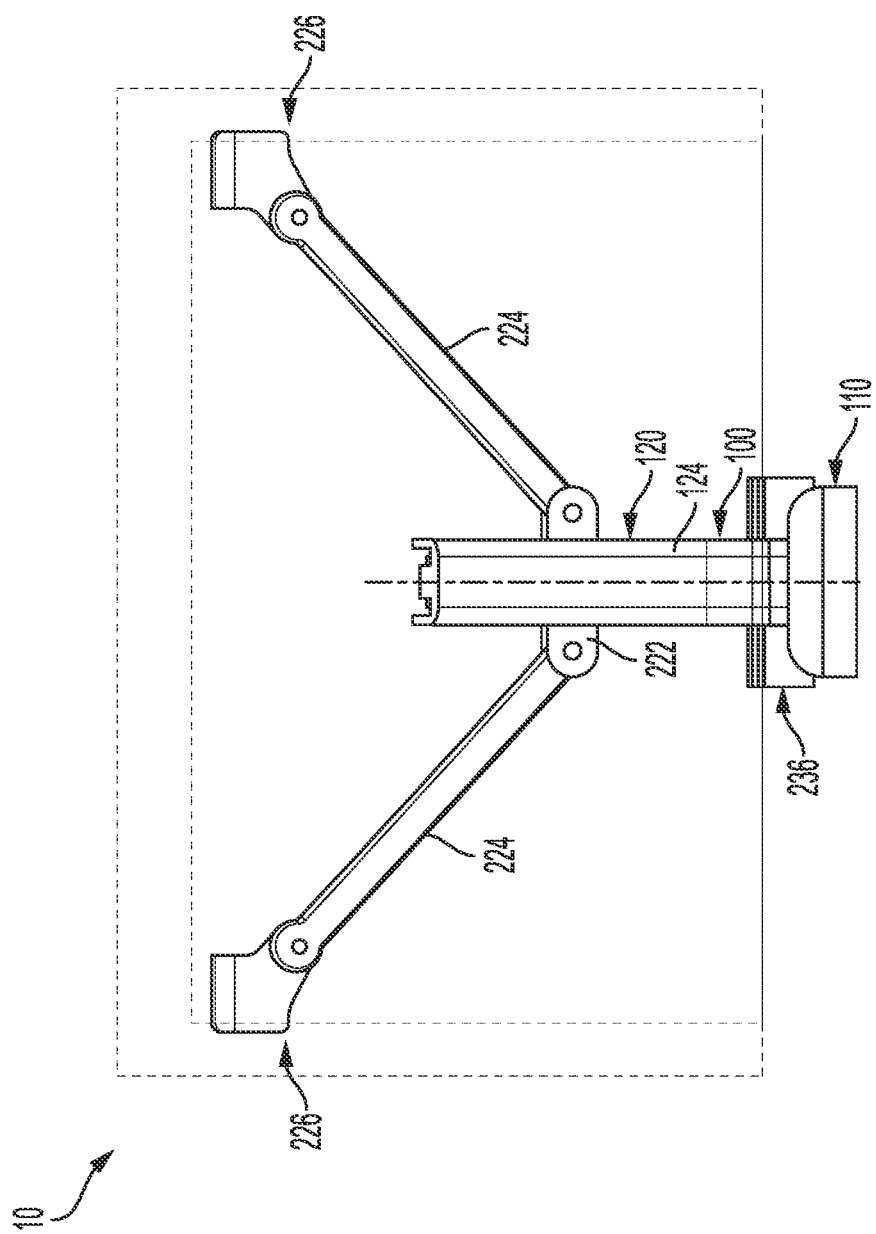
FIG. 13 illustrates a perspective rear view of the embodiment shown in FIG. 12.

Once the security assembly 200 is received by and coupled to the anchor 100, the entire security apparatus 10 is secured to the display fixture 50. Referring to FIGS. 1A-3B and 11-13, the portable electronic device 300, such as a laptop computer, is placed such that the keyboard portion 304 is proximate the guide 210 and the display portion 302 is positioned away from the guide 210. The first extension assembly 220 is then moved in the first direction. While facilitating movement in the first direction, the extensions 224 and the holders 226 pivot to draw in the keyboard portion 304 and size the first extension assembly 220 so the retainers 228 retain at least two corners of the keyboard portion 304. As shown in FIG. 11, the first extension assembly 220 may be adjusted to secure a larger laptop computer (such as a Dell® 15 shown in phantom) or conversely, may be adjusted to secure a smaller laptop computer (such as a Dell® 14 shown in phantom) as shown in FIGS. 12 and 13. Continued movement of the first extension assembly 220 in the first direction acts to secure a side of the keyboard portion 304 within the retainer 238.

Once the portable electronic device 300 is secured within the security apparatus 10, it may be rotated with respect to the display fixture 50. Furthermore as shown in FIGS. 1A-3B, the display portion 302 remains free to be articulated relative to the keyboard portion 304. In order to remove the portable electronic device 300 from the security apparatus 10, the anchor 100 is decoupled from the display fixture 50. The release element 119 is actuated to disengage the one or more securing element engagement members 219 from the one or more securing elements 129 in order to separate the security assembly 200 from the anchor 100. The release element 119 is operatively connected to a latch engager (not shown) positioned at least partially within the one or more securing elements 129. Operation of the release element 119 disengages the latch engagers from the one or more securing element engagement members 219. The release element 119 may be a pushbutton, switch, or any other suitable element to release the security assembly 200 from the anchor 100. The depression plate 216a on the guide 210 is now accessible and may be depressed to enable the first extension assembly 220 to be moved in the second direction to release the portable electronic device 300.

One or more components of the convertible security apparatus 10 may be comprised of a metal or strong plastic or any combination thereof.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, they are used only in a generic and descriptive sense, and not for the purposes of limiting the present disclosure.

The invention claimed is:

1. A security apparatus for a laptop computer, comprising:
   an anchoring member configured to be removably coupled to a display surface, wherein the anchoring member defines a cavity and comprises one or more securing elements positioned in the cavity; and
   a security assembly configured to be removably coupled to the anchoring member, wherein the security assembly comprises,
       a guide comprising one or more securing element engagement members,
       a first extension assembly moveably coupled to the guide, wherein the first extension assembly comprises,
           a support comprising a lock configured to be moved between a locked state and an unlocked state, and
           at least two extensions pivotally coupled to the support, and
       a second extension assembly coupled to the guide, wherein the second guide assembly comprises,
           a support coupled to the guide, and
           at least one holder coupled to the support,
       wherein the security assembly is configured to be at least partially received in the cavity of the anchoring member and the one or more securing elements are configured to engage with the one or more securing element engagement members to releasably couple the security assembly to the anchoring member.

2. The security apparatus of claim 1, wherein the guide defines an opening traversing the guide.

3. The security apparatus of claim 2, wherein the first extension assembly is coupled to the guide through the opening.

4. The security apparatus of claim 1, wherein the anchoring member further comprises a release element configured to disengage the one or more securing elements from the one or more securing element engagement members.

5. The security apparatus of claim 1, wherein the at least one extension of the first extension assembly comprises a holder configured to accept and retain a portion of a portable electronic device.

6. The security apparatus of claim 1, wherein the first extension assembly is moveably coupled to the guide.

7. The security apparatus of claim 1, wherein in the unlocked state, the first extension assembly is enabled to move in a first direction along the guide and a second direction along the guide, wherein the first direction is towards the second extension assembly, and wherein the second direction is away from the second extension assembly.

8. The security apparatus of claim 7, wherein in the locked state, the first extension assembly is inhibited from moving in the second direction away from the second extension assembly.

* * * * *